May 14, 1940.  A. H. REDFERN  2,200,862
DRY CELL
Filed March 5, 1939  2 Sheets-Sheet 1
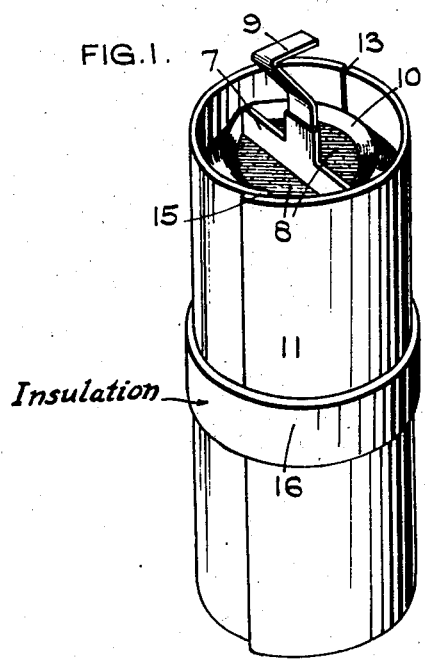
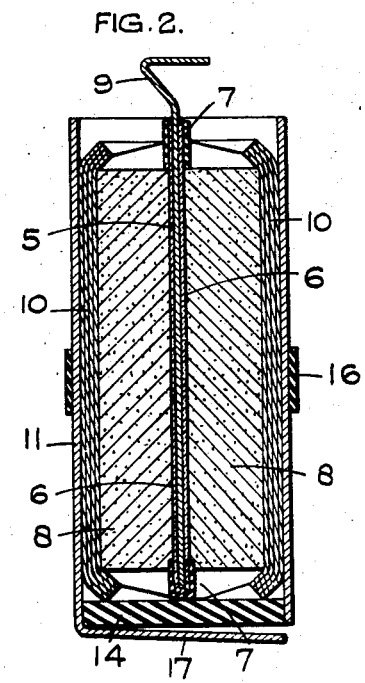
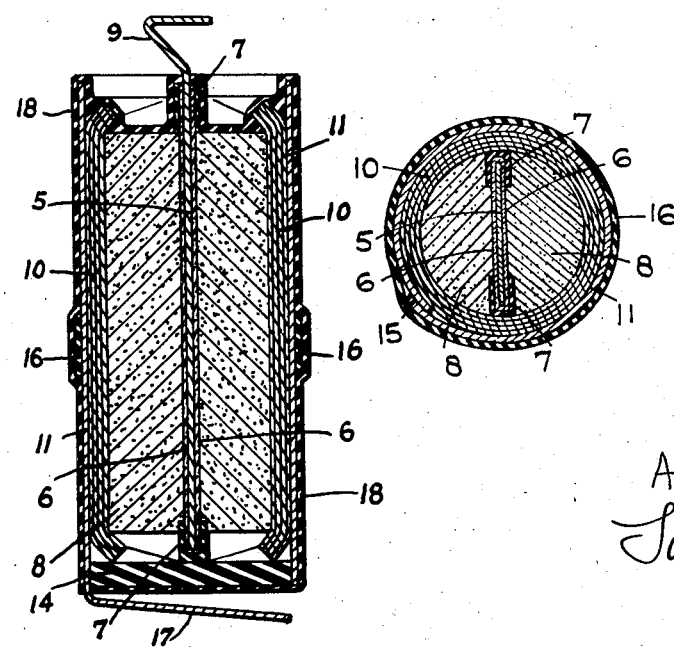
Alfred Henry Redfern
Inventor
Attorneys.

May 14, 1940.　　　A. H. REDFERN　　　2,200,862
DRY CELL
Filed March 5, 1938　　　2 Sheets-Sheet 2

Alfred Henry Redfern
Inventor

Saulmin & Saulmin
Attorneys.

Patented May 14, 1940

2,200,862

UNITED STATES PATENT OFFICE 2,200,862

DRY CELL

Alfred Henry Redfern, Birmingham, England, assignor to Maxolite Holdings Limited, Kingsway, London, England Application March 5, 1938, Serial No. 194,187
In Great Britain December 9, 1935

7 Claims. (Cl. 136—107)

It is at present the common practice to construct dry cells of cylindrical form, each cell usually consisting of a cylinder of zinc closed at the bottom and containing an axially disposed cylindrical pencil of carbon, around which is an annular packing of depolariser, between the exterior of which and the interior of the zinc container the electrolyte is disposed. These cells are usually formed with some part of the zinc container forming one terminal, and with the other terminal in the form of a metal stud or cap placed on the projecting end of the carbon pencil. Such cells are sometimes used singly, and are sometimes assembled in end to end relationship to make a battery. In other cases two of such cells may be arranged side by side and suitably connected to form a battery.

The object of the present invention is to provide a construction which will facilitate assembly by enabling production of the elements of the cell as self-contained units readily assemblable together.

Referring to the drawings:

Figure 1 is a perspective view of a dry cell according to this invention.

Figure 2 is a sectional elevation of same.

Figure 3 is a plan view of same.

Figure 5 is a section similar to Figure 2 but showing the cell encased by a sealing skin.

Figure 4:
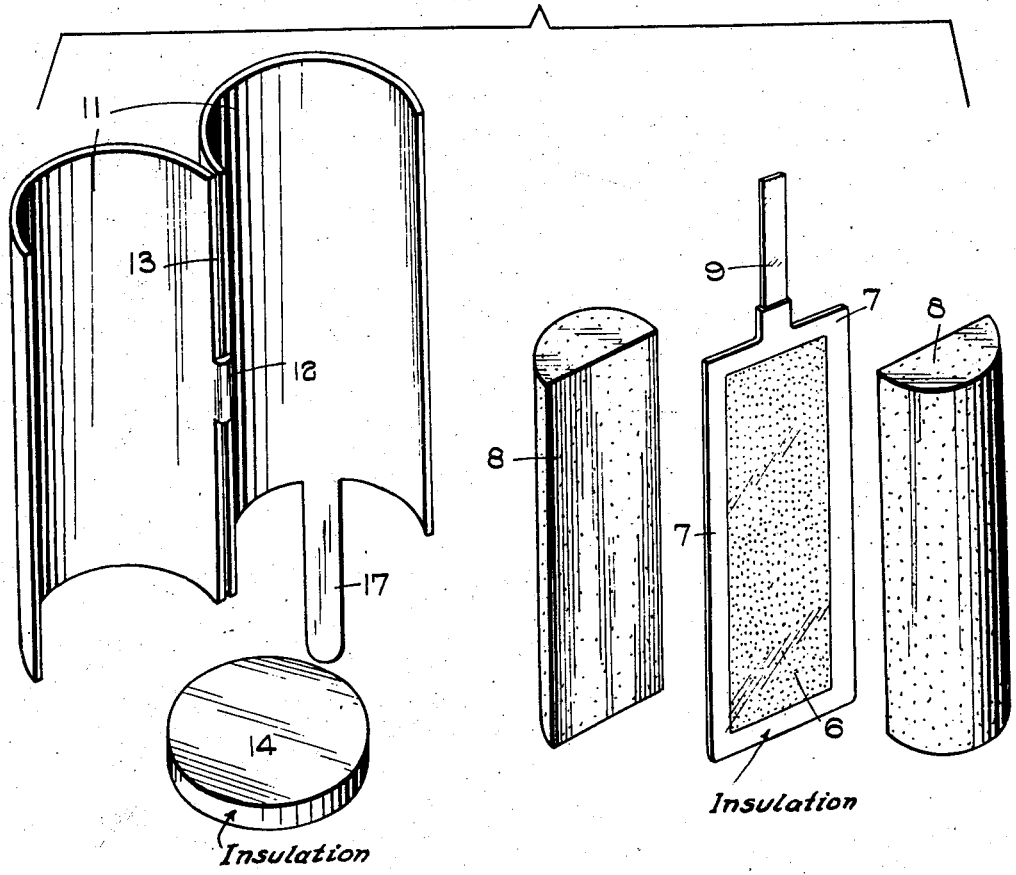
Figure 4 is an exploded view showing the separated parts of same.

In the construction illustrated in the accompanying drawings the dry cell includes a carbon element formed from a comparatively rigid carrier sheet or plate 5 of conducting metal such as zinc provided with a coating 6 of carbonaceous material which extends completely over both flat surfaces of the sheet or plate.

The carbonaceous layer is attached firmly to both surfaces of the plate 5 and may be applied by any of the methods described in our Patents 2,154,312 granted April 11, 1939, 2,165,061 granted July 7, 1939, and 2,146,377 granted February 7, 1939.

The edges of the plate are protected and enclosed by a layer or coating 7 of varnish or other suitable insulating material which forms a marginal covering for the carbon element as is shown in Figure 4 but which leaves exposed the central area of both surfaces of the element.

On each flat surface of the carbon element is placed a block 8 of depolariser material, each block being of substantially half-cylindrical form so that when assembled on the carbon element the two depolariser blocks form a core or dollie of substantially cylindrical form.

The carrier sheet may be rigid if the surfaces thereof are accurately flat so that the flat faces of the depolariser tablets will fit accurately on to such surfaces without air gaps, but since it is generally impractical or commercially difficult to ensure complete flatness of the surfaces of the carrier sheet, this latter is preferably slightly flexible so that effective contact between the sheet and the depolariser tablets can be ensured.

The depolariser material in the form of a paste may be made from materials commonly used in cells of the kind to which the present invention relates and may be pressed or moulded into the desired shape before being applied to the faces of the carbon element.

If desired, one or more cavities may be formed in the depolariser to provide for expansion and to accommodate gas generated in the cell in use.

The sheet 5 has at one end an integral projection 9 which is bent to the shape shown in Figures 1 and 2 to form a terminal for the carbon element and if desired this strip 9 may be doubled upon itself or provided with a stud or other device adapted to form a suitable terminal.

The carbon coating which extends over both flat surfaces and may extend over the edges of the main portion of the plate 5, may also be extended for a short distance along the strip 9 and the varnish coating 7 may also extend partly up the strip 9 as shown in Figure 4.

If desired, the carbon coating may be extended over the whole length of the strip 9 and the varnish coating may be provided for a convenient distance along this strip, leaving a part uncovered to form the actual terminal portion.

The assembly of the carbon element and depolariser blocks is then enclosed in a wrapping 10 of suitable paper or other sheet material impregnated with electrolyte and this wrapping may be of laminated form and preferably extends slightly beyond the ends of the depolariser blocks as is shown in Figure 2.

If desired, the wrapping may be extended to cover the ends of the depolariser block.

This assembly is then enclosed in a band or container of zinc which constitutes the second electrode for the cell and which is of a form capable of being contracted so as to fit tightly around the exterior of the assembly. In the preferred construction illustrated in the drawings this band or container 11 is formed from a sheet of zinc pressed into two half-cylindrical or channel-like portions arranged side by side as shown in Figure 4 and connected by a portion 12.

The two channel-like portions are formed from a single sheet but the metal is slit at 13 along a line substantially mid-way of the length of the zinc sheet, the slit extending inwardly from two opposite sides of the sheet but terminating short of the centre of the sheet to leave the integral connecting portion 12.

The assembly consisting of the carbon element, blocks of depolariser and electrolyte sheet is placed in one channel-like part and the other part is then turned about the portion 12 until the assembly is enclosed as shown in Figures 2 and 3.

A disc or washer 14 of rubber or other suitable material may be inserted at the end of the container remote from that at which projects the terminal strip 9 in the completed cell and if desired a similar disc or washer may be provided at the other end of the cell, such further disc or washer being apertured for the passage of the terminal strip 9. Such disc or discs close the end or ends of the cell and also assist in preserving the external shape of the cell.

In its final form the zinc container binds all the elements of the cell firmly together and presses the depolariser blocks firmly on to the surfaces of the carbon element and holds the electrolyte sheet in good contact with the exterior of the depolariser. The edges of the two halves of the zinc container overlap at 15 as shown in Figure 3, but this overlapping of the edges is not essential and there may be a slight gap between them.

The assembly is held together in the final form and this may be done by a band 16 of rubber or other elastic material so that the inner surface of the zinc container is held in contact with the outer surface of the electrolyte sheet and the several elements of the cell maintained firmly in association. If desired, two or more rubber or elastic bands may be provided.

Formed integrally with one part of the zinc casing is a strip 17 adapted to form the second terminal strip of the cell and with the construction shown in the accompanying drawings this strip is bent to extend beneath the disc 14 for contact with the terminal strip 9 of a further cell arranged co-axially as is commonly the case with batteries for lamps of the torch type.

The terminal strip 17 may be disposed on the zinc container to project from either end or any other part enabling this strip to be bent into a suitable position to form the second terminal of the battery and if desired, this strip 17 may be provided with a stud or other part to form a terminal or may be welded or otherwise secured to the carbon element of an adjacent cell either disposed at the side of or co-axially with the cell.

The whole assembly of the form shown in Figures 1 and 2 may then be sealed by a thin adhering skin of an elastic and waterproof nature as shown at 18 in Figure 5, this skin being applied by dipping, spraying or brushing as described in our Patent 2,146,377 granted February 7, 1939.

A battery including a plurality of cells can be constructed in the known manner by assembling the required number of cells end to end with adjacent terminals in contact or side by side with suitable interconnections.

What I claim then is:

1. A dry cell or battery including a carbon electrode in the form of a conducting metal plate having substantially flat surfaces, a coating of carbonaceous material on each of said surfaces, two separately formed blocks of depolariser one on each of said surfaces, each of said blocks of depolariser being of width co-extensive with that of one of the flat surfaces of said electrode and said blocks conjointly forming a substantially cylindrical outer surface, electrolyte carrying membrane around the outer surface of said depolariser blocks and an open ended substantially cylindrical band of zinc completely surrounding said elements and forming the zinc electrode of the cell, said band being split longitudinally for radial contraction to press the surrounded elements into contacting engagement.

2. A dry cell or battery including a carbon electrode in the form of a conducting metal plate having substantially flat surfaces, a coating of carbonaceous material on each of said surfaces, two separately formed blocks of depolariser one on each of said surfaces and contacting with the carbonaceous coating thereon, each of said blocks of depolariser having a flat face of width coextensive with and engaging one of said flat surfaces and having a substantially half cylindrical face, the last mentioned faces of said blocks conjointly forming a substantially cylindrical outer surface, an electrolyte carrier wrapped around said outer surface, and an open-ended substantially cylindrical band of zinc completely surrounding said elements and forming the zinc electrode of the cell, said band being split longitudinally for radial contraction to press the surrounded elements into contacting engagement.

3. A dry cell or battery including a carbon electrode in the form of a conducting metal plate having substantially flat surfaces, a coating of carbonaceous material on each of said surfaces, a marginal coating of insulating material around the edges of said plate, two separately formed blocks of depolariser one on each of said surfaces and contacting with the carbonaceous coating thereon, said blocks of depolariser conjointly forming a substantially cylindrical outer surface, an electrolyte carrier around the outer surface of said depolariser blocks and a band of zinc surrounding said elements and forming the zinc electrode of the cell, said band being open ended and split longitudinally for radial contraction to press the surrounded elements into contacting engagement.

4. A dry cell or battery including a carbon electrode in the form of a conducting metal plate having substantially flat surfaces, a coating of carbonaceous material on each of said surfaces, two separately formed blocks of depolariser one on each of said surfaces and contacting with the carbonaceous coating thereon, each of said blocks of depolariser being of width co-extensive with that of one of the flat surfaces of said electrode and said blocks conjointly forming a substantially cylindrical outer surface, an electrolyte carrier wrapped around said outer surface, an open-ended, longitudinally split band of zinc surrounding said elements and forming the zinc electrode of the cell, said band comprising two half-cylindrical portions united by an integral connecting portion and a plug closing the lower open end of said band.

5. A dry cell or battery including a carbon electrode in the form of a conducting metal plate having substantially flat surfaces, a coating of carbonaceous material on each of said surfaces, separately formed blocks of depolariser one on each of said surfaces and contacting with the carbonaceous coating thereon, said blocks of depolariser conjointly forming a substantially cylindrical outer surface, an electrolyte carrier wrapped around said outer surface, a band of zinc completely surrounding said elements and forming the zinc electrode of the cell, said band being open ended and split longitudinally for radial contraction to press the surrounded elements into contacting engagement and an elastic binding surrounding said band of zinc to retain the cell elements in association.

6. A dry cell or battery including a carbon electrode in the form of a conducting metal plate having substantially flat surfaces, a coating of carbonaceous material on each of said surfaces, two separately formed blocks of depolariser one on each of said surfaces and contacting with the carbonaceous coating thereon, each of said blocks of depolariser having a flat face of width coextensive with and engaging one of said flat surfaces and having a substantially half cylindrical face, the last mentioned faces of said blocks conjointly forming a substantially cylindrical outer surface, an electrolyte carrier wrapped around said outer surface, a substantially cylindrical band of zinc completely surrounding said elements and forming the zinc electrode of the cell, said band being open ended and split longitudinally for radial contraction to press the surrounded elements into contacting engagement, and an elastic enclosure surrounding said band of zinc to retain the cell elements in association.

7. A dry cell or battery including a carbon electrode in the form of a conducting metal plate having substantially flat surfaces, a coating of carbonaceous material on each of said surfaces, two separately formed blocks of depolariser one on each of said surfaces and contacting with the carbonaceous coating thereon, each of said blocks of depolariser having a flat face of width coextensive with and engaging one of said flat surfaces and having a substantially half cylindrical face, the last mentioned faces of said blocks conjointly forming a substantially cylindrical outer surface, an electrolyte carrier wrapped around said outer surface, a substantially cylindrical band of zinc completely surrounding said elements and forming the zinc electrode of the cell, said band being open ended and split longitudinally for radial contraction to press the surrounded elements into contacting engagement, and a thin adhering skin of elastic and waterproof material enclosing said elements and sealing the battery.

ALFRED HENRY REDFERN.